2,891,924

Patented June 23, 1959

2,891,924

PROCESS FOR PROMOTING THE LOW-HYSTERESIS PROCESSING OF RUBBER AND CARBON BLACK USING AN N-SUBSTITUTED BENZOTHIAZOLESULFENAMIDE

Kenneth W. Doak, Bloomfield, N.J., assignor to United States Rubber Company, New York, N.Y., a corporation of New Jersey No Drawing. Application December 11, 1953
Serial No. 397,765

11 Claims. (Cl. 260—41.5)

This invention relates to improvements in the technique of processing high carbon black-rubber mixes prior to vulcanization thereof, and more particularly to improvements in so-called "low-hysteresis" processing of carbon black-rubber mixes.

The technique of processing high carbon black-rubber mixes prior to vulcanization thereof, whereby to obtain vulcanizates with improvements in physical and chemical properties, is described in Gerke et al. U.S.P. 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

These improved vulcanizates are obtained, in accordance with the Gerke et al. technique, by incorporating in the rubber a relatively large amount of carbon black, for example, at least 25 parts, and preferably in the case of tire treads at least 40 parts by weight of carbon black per 100 parts by weight of rubber, and then subjecting a substantially homogeneous mixture of the ingredients to a heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes' duration will be found suitable for most purposes, particularly within the preferred temperature range.

An object of the present invention is to provide new chemical promoters for the processing of rubber and carbon black mixes as described in U.S.P. 2,118,601 whereby to obtain high electrical resistance and low torsional hysteresis of tread stocks. A further object is to provide substantial decreases in the time of the low-hysteresis processing by the use of the herein disclosed chemicals with consequent increase in the capacity and output of equipment. Other objects will appear more fully hereinafter.

I have found that certain 2-benzothiazolesulfenamides substantially decrease the time and/or reduce the temperature necessary for low-hysteresis processing of mixtures of natural rubber or synthetic rubbers containing 50% or more of combined aliphatic conjugated diolefin hydrocarbon with carbon black.

The 2-benzothiazolesulfenamides used in the practice of my invention are N- substituted and typically have the general formula

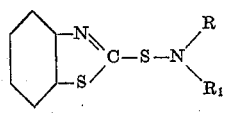

wherein R is selected from hydrogen, alkyl and cycloalkyl, and $R_1$ is selected from alkyl, hydroxyalkyl, cycloalkyl, aralkyl, alkylene joined to a carbon atom of R (in which case R is alkyl less one hydrogen, i.e., is alkylene), and alkylenoxy joined to a carbon atom of R (in which case R again is alkyl less one hydrogen, i.e., is alkylene). Thus, R and $R_1$ may together constitute an alkylene group as in the piperidine ring, or an oxydialkylene group, as in the morpholine ring.

The alkyl groups generally are lower alkyl containing not more than 6 carbon atoms. The heterocyclic ring when present is usually six-membered. The cycloalkyl groups are generally cyclohexyl. The aralkyl group is generally benzyl.

Instead of compounds having the general formula given above, I can equivalently therewith use N,N'-alkylene-bis-(2-benzothiazolesulfenamides) which have the formula

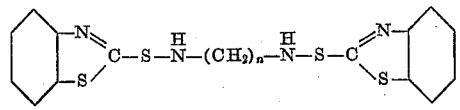

where n is an integer, usually having a value of from 2 to 4.

The most well-known commercial compound of the general formula given above is N-cyclohexyl-2-benzothiazolesulfenamide. An example of a commercial form is the material known as "Santocure."

Examples of other compounds which can be used are:

N,N-diisopropyl-2-benzothiazolesulfenamide
N,N-oxydiethylene-2-benzothiazolesulfenamide
N,N-dicyclohexyl-2-benzothiazolesulfenamide
N-n-propyl-2-benzothiazolesulfenamide
N-n-butyl-2-benzothiazolesulfenamide
N-n-amyl-2-benzothiazolesulfenamide
N-methyl-2-benzothiazolesulfenamide
N-ethyl-2-benzothiazolesulfenamide
N,N'-ethylene-bis-(2-benzothiazolesulfenamide)
N-benzyl-2-benzothiazolesulfenamide
N-isopropyl-2-benzothiazolesulfenamide
N-s-butyl-2-benzothiazolesulfenamide
N-s-amyl-2-benzothiazolesulfenamide
N-t-amyl-2-benzothiazolesulfenamide
N,N-diethyl-2-benzothiazolesulfenamide
N,N-di-n-butyl-2-benzothiazolesulfenamide
N,N-di-n-propyl-2-benzothiazolesulfenamide
N-beta-hydroxyethyl-2-benzothiazolesulfenamide
N-(beta-hydroxy-t-butyl)-2-benzothiazolesulfenamide
N-t-butyl-2-benzothiazolesulfenamide
N,N-pentamethylene-2-benzothiazolesulfenamide The promoters of my invention are also known accelerators of the vulcanization of rubber. I have found that the same chemical can function in a dual capacity, i.e., as a promoter of low-hysteresis processing and subsequently as an accelerator during vulcanization. Thus, it is possible to reduce the amount of accelerator added subsequently and, if a sufficient amount of the promoter is used, to completely dispense with the later addition of accelerator preparatory to vulcanization.

The promoters of my invention are effective in natural rubber (i.e., Hevea rubber), in synthetic rubbery homopolymers of aliphatic conjugated diolefin hydrocarbons, especially butadiene and isoprene, and in synthetic rubbery copolymers containing 50% or more of such diolefin hydrocarbons copolymerized with copolymerizable monoolefinic compounds, e.g., styrene, acrylonitrile, monovinylpyridines, etc. My invention is especially applicable to natural rubber, to butadiene-styrene rubbery copolymers (GR-S), to mixtures of natural rubber and such copolymers, and to butadiene-acrylonitrile rubbery copolymers (Buna N). I find that my promoters are not effective in "Butyl" rubber.

The process of my invention comprises mixing the rubber with a relatively large amount of a rubber-reinforcing carbon black and a relatively small amount, i.e., from 1 to 3 parts per 100 parts of rubbery material, of a sulfenamide of the type named above, and heating this mixture at a temperature of from 275° F. to a temperature just short of that at which the rubber would be injured, e.g., at 275–400° F., and masticating the mixture during or following the heat treatment. This process brings about the desired changes in the rubber-carbon black mixture whereby a vulcanizate of this mixture will have a considerably reduced torsional hysteresis and a considerably increased electrical resistivity. This heat treatment is carried out in the absence of vulcanizing agents, e.g., sulfur or sulfur-yielding compounds. Following the heat treatment, the vulcanizing and other desired compounding ingredients including conventional accelerators, if necessary or desired, and the like are intimately incorporated in the conventional manner, after which the mixture is shaped and vulcanized in the usual way.

If desired small amounts of softeners, e.g., hydrocarbons commonly used as rubber softeners, and/or fatty acid, especially stearic acid, can be present during the heat treatment. If stearic acid is present in sufficient amount, its later addition is unnecessary.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as great as 100 parts per 100 parts of rubber.

In the preferred practice of my invention, the heat treatment of the mixture of rubber, carbon black and sulfenamide promoter is carried out by mastication at temperatures in the range of 275–400° F., more preferably in the range of 300–375° F., with any suitable type of masticating equipment such as an open two-roll rubber mill or more preferably an internal rubber mixer, especially a Banbury mixer. The Banbury mixer is particularly advantageous because it exerts a severe masticatory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary depending upon many factors, including the temperature of heat treatment, type of heat treatment, i.e., whether it is static or dynamic, type of equipment used, e.g., in the case of masticatory heat treatment whether an open rubber mill or a Banbury or other type of internal mixer is used, amount of sulfenamide promoter used, etc. In any event, the treating time will be considerably shorter at given temperature conditions, than the time required when the sulfenamide is omitted. In the case of the preferred masticatory treatment, times of the order of 5 to 30 minutes will generally be adequate for the purposes of my invention, the longer times being used at the lower temperatures and vice versa. It is well known that different rubbers vary as to the highest temperatures they can withstand without harm and the time and temperature should of course be so regulated as to not impair the properties of the final vulcanizate.

It is preferable to form an intimate mixture of the rubber, carbon black and sulfenamide at a relatively low temperature, i.e., below 275° F., in order to avoid premature reaction of the sulfenamide whereby its promoting effect upon the low-hysteresis processing would be seriously reduced.

The following examples illustrate the preferred methods of practicing the invention. All parts are by weight.

*Example 1*

A masterbatch is prepared by mixing together 100 parts of natural rubber, 50 parts of carbon black (a medium processing channel black commercially known as "Spheron #6") and five parts of stearic acid. This mixing operation is carried out in a conventional manner in a Banbury mixer or on a two-roll rubber mill. To 155 parts of this masterbatch is added 2.6 parts of "Santocure," on a two-roll mill at 150–250° F. The mill temperature is then raised to 300° F., and the mixture is then masticated for 10 minutes. Thereafter, 2 parts of pine tar, 2 parts of zinc oxide, 1 part of antioxidant, 0.6 part of accelerator, and 2.6 parts of sulfur are incorporated at 150–225° F. The mixture is vulcanized 45 minutes at 287° F., in a mold. As a control, an identical masterbatch is prepared and subjected to the same manipulative steps, except that no sulfenamide is added. The specific electrical resistivity and torsional hysteresis are measured, with the following results.

| | Log Resistivity | Tors. Hyst. at 280° F. | ML-4 at 212° F. |
| --- | --- | --- | --- |
| Control | 7.8 | 0.132 | 56 |
| With "Santocure" | 10.4 | .082 | 37 |

The practice of the invention has thus raised the specific electrical resistivity by a factor of about 400, and has reduced the torsional hysteresis at 280° F. by over 40%. The stock, before vulcanization, has a reduced viscosity.

*Example 2*

A masterbatch of 100 parts of a butadiene-styrene copolymer (GR-S polymerized at 41° F.), 52 parts of a medium processing channel black ("Spheron #6"), 6 parts of hydrocarbon softener ("Paraflux"), and one part of stearic acid is prepared in a conventional manner, then 2.0 parts of "Santocure" is incorporated at 225° F. This mixture is masticated for 10 minutes at 325° F. in a Banbury mixer. Thereafter, 3 parts of zinc oxide and 2 parts of sulfur are incorporated at 225° F. and the stock is vulcanized for 30 minutes at 293° F. No accelerator is required. As a control, an identical masterbatch is subjected to the same steps, except that no sulfenamide is added during the high temperature mastication. One part of 2-mercaptobenzothiazole, 0.25 part of diphenylguanidine, 3.0 parts of zinc oxide, and 2.0 parts of sulfur are used as vulcanizing ingredients in the control to obtain comparable vulcanization. Electrical resistivity and torsional hysteresis are measured.

| | Log Resistivity | Tors. Hyst. at 280° F. |
| --- | --- | --- |
| Control | 8.0 | 0.134 |
| With "Santocure" | 9.4 | .100 |

The use of "Santocure" improves the abrasion resistance 10–15%.

*Example 3*

A masterbatch is prepared by mixing in a conventional manner 100 parts of a copolymer of butadiene and acrylonitrile (known commercially as "Paracril 18-80," containing 18-20% combined acrylonitrile and 82-80% butadiene and having a Mooney viscosity of 50-60), 50 parts of a medium processing channel black, 6 parts of hydrocarbon oil, and 1 part of stearic acid. To this masterbatch is added 2.0 parts of "Santocure" at about 225° F. The mixture is then masticated in a Banbury mixer for 8 minutes at 325° F. Thereafter, 5 parts of zinc oxide, 0.5 part of "MBTS" (2-mercaptobenzothiazyl disulfide), and 1.1 parts of sulfur are incorporated, and the stock is vulcanized 60 minutes at 293° F. A control stock is prepared in an identical manner except that no sulfenamide is added, and the stock is vulcanized with 5 parts of zinc oxide, 1 part of 2-mercaptobenzothiazyl disulfide, and 1.6 parts of sulfur.

|  | Log Resistivity | Tors. Hyst. at 280° F. |
|---|---|---|
| Control | 8.0 | 0.157 |
| Sample with "Santocure" | 9.6 | 0.117 |

The practice of the invention has increased the electrical resistivity and decreased the torsional hysteresis.

*Example 4*

A masterbatch is prepared from 60 parts of a butadiene-styrene copolymer (GR-S polymerized at 41° F.), 40 parts of natural rubber, 55 parts of a medium processing channel black ("Spheron #6"), 5 parts of hydrocarbon softener, and 2 parts of stearic acid. The promoters listed below are mixed into portions of the masterbatch at about 225° F. The stocks are then masticated 8 minutes at 325° F. in a Banbury mixer. A control receives the same treatment, except that no promoter is added. The stocks are subsequently compounded with sulfur and zinc oxide and vulcanized to obtain the state of cure normally used in tire treads. No accelerator is needed for the stocks with the promoters, which also function as accelerators of vulcanization. Electrical resistivity and torsional hysteresis are measured.

| Promoter, Parts | Log Resistivity | Tors. Hyst. at 280° F. |
|---|---|---|
| None | 7.8 | 0.189 |
| N,N - Oxydiethylene - 2 - benzothiazolesulfenamide, 1.5 parts | 10.0 | 0.119 |
| N,N - Dicyclohexyl - 2 - benzothiazolesulfenamide, 2.0 parts | 11.1 | 0.091 |

The practice of the invention has markedly increased the electrical resistivity and decreased the torsional hysteresis.

Although I have disclosed my invention with particular emphasis upon the preferred practice wherein the heat treatment is accompanied with mastication, nevertheless my invention can be practiced by carrying out the heat treatment under static conditions. For example, I may intimately mix the rubber, carbon black and sulfenamide compound in any suitable manner and then heat this mixture at 275-400° F. without simultaneously masticating it, the heat-treated mixture being subsequently masticated and compounded with conventional compounding and vulcanizing ingredients followed by shaping and vulcanizing in the usual way. The static heat-treatment can be conducted by placing slabs of the stock in an oven heated to a suitable temperature, or slabs of hot stock can be stacked up and allowed to stand for several hours, preferably under relatively non-heat-conductive conditions, in order to maintain the mixture at the temperature of 275-400° F. for as long as reasonably possible. If desired, the slabs can be wrapped with a suitable insulating blanket to cause prolonged retention of heat. Such static heat treatment has the advantage of releasing the Banbury equipment from use for carrying out the heat treatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (expressed in ohm-cms.) is designated "Log resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further description of this test see Gerke et al., 2,118,601.

Having thus described my invention, what I claim and desire to protect by Letters Patent is:

1. A process which comprises mixing a rubber selected from the group consisting of natural rubber, synthetic rubbery homopolymers of aliphatic conjugated diolefin hydrocarbons, and synthetic rubbery copolymers containing at least 50% of an aliphatic conjugated diolefin hydrocarbon copolymerized with correspondingly not more than 50% of a copolymerizable monoethylenically unsaturated compound with a relatively large amount of rubber-reinforcing carbon black and an N-substituted 2-benzothiazolesulfenamide selected from the group consisting of (1) compounds having the general formula

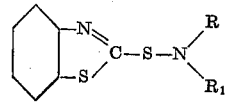

wherein R is selected from the group consisting of hydrogen, alkyl and cycloalkyl, and $R_1$ is selected from the group consisting of alkyl, hydroxyalkyl, cycloalkyl, aralkyl, alkylene joined to a carbon atom of R when R is alkyl, and alkylenoxy joined to a carbon atom of R where R is alkyl, and (2) compounds having the formula

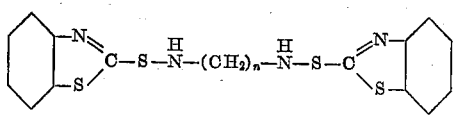

wherein $n$ is an integer in amount equal to from 1 to 3 parts per 100 parts of said rubber, heating the mixture at a temperature of at least 275° F. but below that at which the rubber would be harmed, masticating the mixture and completing incorporation of vulcanizing and other desired ingredients, shaping the mass, and vulcanizing the resulting shaped mass.

2. A process which comprises mixing a rubber selected from the group consisting of natural rubber, synthetic rubbery homopolymers of aliphatic conjugated diolefin hydrocarbons, and synthetic rubbery copolymers containing at least 50% of an aliphatic conjugated diolefin hydrocarbon copolymerized with correspondingly not more than 50% of a copolymerizable monoethylenically unsaturated compound with a relatively large amount of rubber-reinforcing carbon black and an N-substituted 2-benzothiazolesulfenamide selected from the group consisting of (1) compounds having the general formula

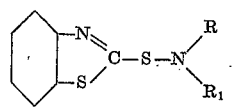

wherein R is selected from the group consisting of hydrogen, alkyl and cycloalkyl, and $R_1$ is selected from the group consisting of alkyl, hydroxyalkyl, cycloalkyl, aralkyl, alkylene joined to a carbon atom of R when R is alkyl, and alkylenoxy joined to a carbon atom of R when R is alkyl, and (2) compounds having the formula

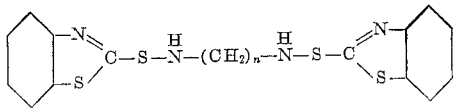

wherein *n* is an integer in amount equal to from 1 to 3 parts per 100 parts of said rubber, masticating the mixture at a temperature of from 275° to 400° F., thereafter incorporating vulcanizing and other desired ingredients, shaping the mass, and vulcanizing the resulting shaped mass.

3. The process of claim 2 wherein said sulfenamide is N-cyclohexyl-2-benzothiazolesulfenamide.

4. The process of claim 2 wherein said sulfenamide is N,N-oxydiethylene-2-benzothiazolesulfenamide.

5. The process of claim 2 wherein said sulfenamide is N,N-dicyclohexyl-2-benzothiazolesulfenamide.

6. The process which comprises mixing natural rubber with a relatively large amount of a rubber-reinforcing carbon black and an N-substituted 2-benzothiazolesulfenamide selected from the group consisting of (1) compounds having the general formula

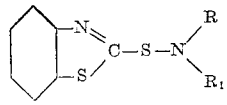

wherein R is selected from the group consisting of hydrogen, alkyl and cycloalkyl, and R₁ is selected from the group consisting of alkyl, hydroxyalkyl, cycloalkyl, aralkyl, alkylene joined to a carbon atom of R when R is alkyl, and alkylenoxy joined to a carbon atom of R when R is alkyl, and (2) compounds having the formula

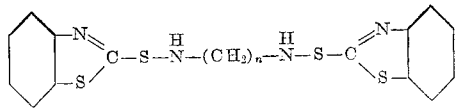

wherein *n* is an integer in amount equal to from 1 to 3 parts per 100 parts of said rubber, masticating the mixture at a temperature of from 275 to 400° F., thereafter incorporating vulcanizing and other desired ingredients, shaping the mass, and vulcanizing the resulting shaped mass.

7. A process which comprises mixing a rubbery copolymer of butadiene and styrene with a relatively large amount of a rubber-reinforcing carbon black and an N-substituted 2-benzothiazolesulfenamide selected from the group consisting of (1) compounds having the general formula

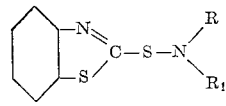

wherein R is selected from the group consisting of hydrogen, alkyl and cycloalkyl, and R₁ is selected from the group consisting of alkyl, hydroxyalkyl, cycloalkyl, aralkyl, alkylene joined to a carbon atom of R when R is alkyl, and alkylenoxy joined to a carbon atom of R when R is alkyl, and (2) compounds having the formula

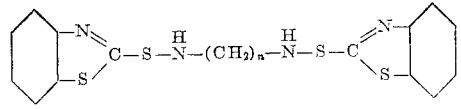

wherein *n* is an integer in amount equal to from 1 to 3 parts per 100 parts of said copolymer, masticating the mixture at a temperature of from 275 to 400° F., thereafter incorporating vulcanizing and other desired ingredients, shaping the mass, and vulcanizing the resulting shaped mass.

8. A process which comprises mixing rubber comprising a mixture of natural rubber and a rubbery butadiene-styrene copolymer with a relatively large amount of a rubber-reinforcing carbon black and an N-substituted 2-benzothiazolesulfenamide selected from the group consisting of (1) compounds having the general formula

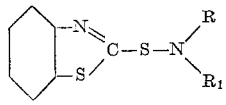

wherein R is selected from the group consisting of hydrogen, alkyl and cycloalkyl, and R₁ is selected from the group consisting of alkyl, hydroxyalkyl, cycloalkyl, aralkyl, alkylene joined to a carbon atom of R when R is alkyl, and alkylenoxy joined to a carbon atom of R when R is alkyl, and (2) compounds having the formula

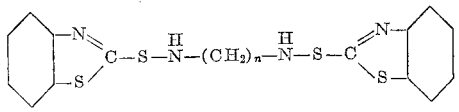

wherein *n* is an integer in amount equal to from 1 to 3 parts per 100 parts of said rubber, masticating the mixture at a temperature of from 275 to 400° F., thereafter incorporating vulcanizing and other desired ingredients, shaping the mass, and vulcanizing the resulting shaped mass.

9. A process which comprises mixing natural rubber with a relatively large amount of a rubber-reinforcing carbon black and from 1 to 3 parts of N-cyclohexyl-2-benzothiazolesulfenamide per 100 parts of said rubber, masticating the mixture at a temperature of from 275 to 400° F., thereafter incorporating vulcanizing and other desired ingredients, shaping the mass, and vulcanizing the resulting shaped mass.

10. A process which comprises mixing a rubbery copolymer of butadiene and styrene with a relatively large amount of a rubber-reinforcing carbon black and from 1 to 3 parts of N-cyclohexyl-2-benzothiazolesulfenamide per 100 parts of said copolymer, masticating the mixture at a temperature of from 275 to 400° F., thereafter incorporating vulcanizing and other desired ingredients, shaping the mass, and vulcanizing the resulting shaped mass.

11. A process which comprises mixing a rubbery copolymer of butadiene and acrylonitrile with a relatively large amount of a rubber-reinforcing carbon black and from 1 to 3 parts of N-cyclohexyl-2-benzothiazolesulfenamide per 100 parts of said copolymer, masticating the mixture at a temperature of from 275 to 400° F., thereafter incorporating vulcanizing and other desired ingredients, shaping the mass, and vulcanizing the resulting shaped mass.

References Cited in the file of this patent

UNITED STATES PATENTS

| | | |
|---|---|---|
| 2,118,601 | Gerke et al. | May 24, 1938 |
| 2,315,849 | Gerke | Apr. 6, 1943 |
| 2,315,850 | Gerke | Apr. 6, 1943 |
| 2,315,855 | Howland | Apr. 6, 1943 |
| 2,315,856 | Howland | Apr. 6, 1943 |
| 2,315,857 | Howland | Apr. 6, 1943 |
| 2,462,572 | Throdahl | Feb. 22, 1949 |
| 2,490,518 | Hand | Dec. 6, 1949 |
| 2,710,287 | Barton et al. | June 7, 1955 |
| 2,715,618 | Doak | Aug. 16, 1955 |
| 2,715,650 | Doak | Aug. 16, 1955 |
| 2,734,885 | Doak | Feb. 14, 1956 |
| 2,734,886 | Doak | Feb. 14, 1956 |